Oct. 5, 1971    F. A. PACHMAYR ET AL    3,609,903
RECOIL PAD WITH INTEGRAL ATTACHING BOSSES
AND METHOD OF MOUNTING
Filed March 13, 1970
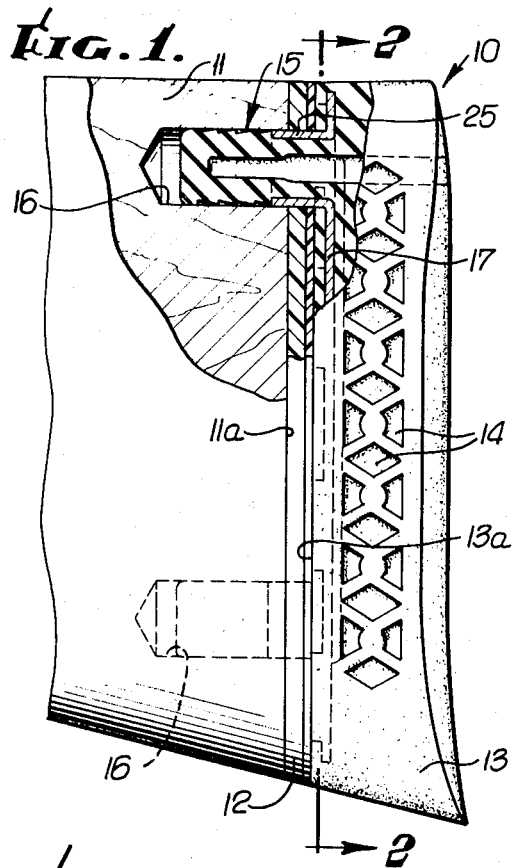
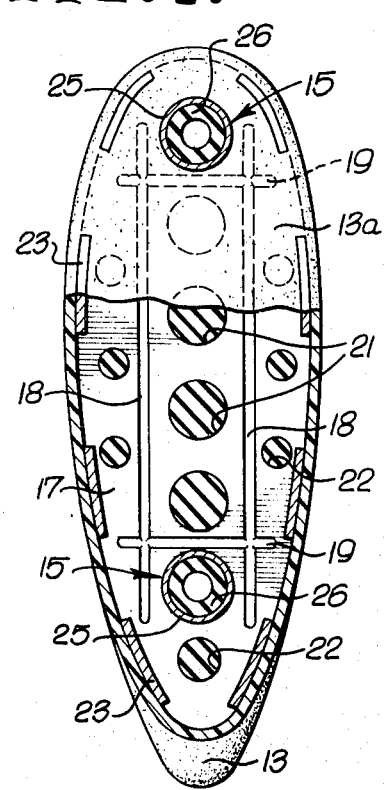
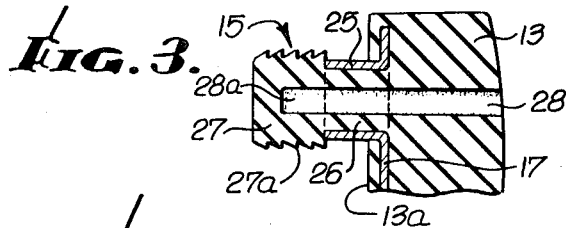
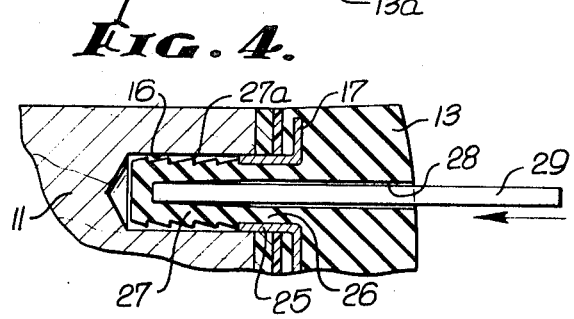
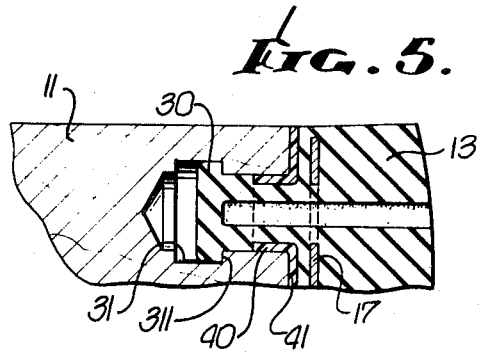
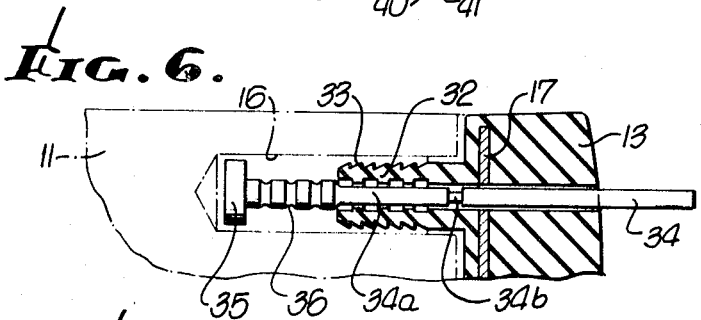
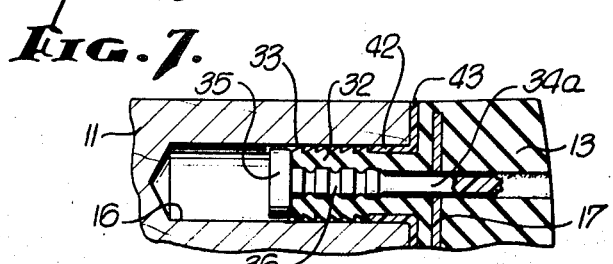
INVENTORS.
FRANK A. PACHMAYR
JACK R. FARRAR
By White & Haefliger
ATTORNEYS.

United States Patent Office 3,609,903
Patented Oct. 5, 1971

3,609,903
RECOIL PAD WITH INTEGRAL ATTACHING BOSSES AND METHOD OF MOUNTING
Frank A. Pachmayr, Los Angeles, and Jack R. Farrar, Whittier, Calif., assignors to Pachmayr Gun Works, Inc., Los Angeles, Calif.
Filed Mar. 13, 1970, Ser. No. 19,252
Int. Cl. F41c 23/00
U.S. Cl. 42—74    17 Claims

ABSTRACT OF THE DISCLOSURE

A firearm recoil pad having a rubber body is mountable to a gunstock by means of tubular rubber bosses receivable within holes in the gunstock and radially deformable by movable rods extending through the pad body into the bosses.

BACKGROUND OF THE INVENTION

While various proposals have been made for the attachment of recoil pads to gunstock, the customary practice has been to make the attachment by screws passing through the pad rubber body into the gunstock.

SUMMARY OF THE INVENTION

The present invention is directed to new modes of pad attachment to a gunstock employing tubular rubber bosses formed integrally with the pad body and receivable within preformed holes in the end face of the gunstock.

The invention has for its general object to provide for expansion of the bosses into pad holding engagement with the walls of the holes by forces transmitted through the pad body either to initially stretch the bosses for entry to and subsequent expansion within the holes, or to expand the bosses against the walls of the holes from initially contracted condition.

Specifically contemplated is transmission of the boss deforming forces by pins or rods extending through the pad body and longitudinally movable to deform the bosses as indicated. For radial reduction of the bosses to permit their accommodation with the holes, the bosses are formed with closed ends engageable by the rods (or a rod) to axially stretch the bosses, following which release at the rod pressure permits expansion of the bosses. Alternatively contemplated is reverse force transmission by the rods under tension to expand the bosses or compress them against the walls of the holes.

The invention further aims to provide in association with the bosses sleeve projections surrounding the bosses and sized to enter the gunstock holes as guides in the pad mounting and to provide rigid lateral support. It is contemplated that such sleeves may be integrally formed projections of a reinforcement plate embedded in the body rubber, or of a spacer or insert between the body and gunstock.

As will appear, the reinforcement plate may be positioned within the body to be engageable against the rigid surface to which the pad is mounted and which may be either the gunstock itself or a spacer between the pad rubber body and the gunstock.

The various features and details of the invention will be more fully understood from the following detailed description of the illustrative embodiments appearing in the accompanying drawing.

BRIEF DESCRIPTION OF THE DRAWING

FIG. 1 is a side elevation, partly sectional, showing one embodiment of the invention;

FIG. 2 is a section on line 2—2 of FIG. 1;

FIG. 3 is a fragmentary section through one of the mounting bosses as carried undeformed by the pad;

FIG. 4 is a similar view illustrative of the mode of attachment of the boss to the gunstock;

FIG. 5 shows a similar variational form of boss and its accommodation in the gunstock; and FIGS. 6 and 7 are illustrative of further variational forms of bosses and their mode of attachment.

DESCRIPTION OF THE PREFERRED EMBODIMENTS

The recoil pad generally indicated at 10 is mounted to the gunstock 11 either indirectly by way of one or more separately formed essentially rigid spacers or base inserts 12, or directly to the gunstock face 11a. The pad body 13 is molded of rubber by the method later described to correspond with the peripheral shape of the end face 11a of the stock 11 or the engaged lamination 12, and to contain cushioning recesses 14 of desired design extending into the body at opposite sides. The pad is attached to the stock by bosses generally indicated at 15 integrally molded with the pad body for reception within the stock cavities 16 as will appear.

In the unattached condition of the pad its inside face 13a may be shallowly recessed close to the periphery of the body rubber to provide a peripheral seal for the body rubber against a rigid surface to which it is mounted.

As best illustrated in FIG. 2 the plate 17, formed as a metal stamping, is embedded in the pad body 13 peripherally spaced inwardly from the side surfaces of the body. The plate may have longitudinal and transverse intersecting ribs 18 and 19 deflected away from the plane of the plate. Inside and outside its central rib-defined area the plate contains openings 21 and 22 for bonding intimacy of the plate to the body rubber.

Peripherally the plate 17 is flanged as by segments 23 turned toward and extending to the inner body face 13a to assure accurate and simplified mountability of the pad body to a rigid base. The segments 23 serve both as legs to space the body of the plate from surface 13a and as rigid supports engaging a rigid surface to preclude, along with the inner surface cavitation, outward displacement or bulge of the body rubber.

The invention is more directly concerned with the boss forms and modes of attachment illustrated in FIGS. 3–7. In reference first to FIGS. 3 and 4, the reinforcement plate 17 is shown to have integral tubular extensions 25 which confine the reduced neck portions 26 of the bosses previously generally indicated at 15. Beyond the plate sleeve 25 the boss in the unattached condition is enlarged at 27 to a cylindrical, or preferably progressively enlarging shape somewhat in excess of the sleeve diameter and the diameter of the hole 16. Preferably the surface of the boss is irregularized as by annular gripping serrations 27a. Passage 28 extending through the body 13 of the pad is in axial alignment with the boss as a continuation of its central opening 28a which is closed, as illustrated, by the enlarged end 27 of the boss.

The passages 28, 28a are provided to accommodate a rod or tool 29 insertable within the passages to effect reduction of the boss diameter to an extent that will permit reception of the bosses within the gunstock holes 16 which are drilled to diameter corresponding substantially to the external diameters of the plate projections 25. Thus with the bosses aligned with the gunstock holes, rod or rods 29 are inserted through the pad to engage the closed end of the boss opening 28a and the rod is forced against the boss to cause its reduction in diameter as illustrated in FIG. 4, sufficiently for reception in the hole 16. Thereafter, upon release of the rod pressure, the boss expands into holding engagement with the wall of the hole. As previously observed, the rigid plate extension 25 serves both to facilitate alignment with the hole and also to support the mounted pad against lateral movement.

FIG. 5 illustrates other variational features of the invention, significant among which is the formation of the tubular boss-confining sleeve 40 as integral extensions of a resinous or hard rubber insert 41 interposed between the pad body 13 and the gunstock 11 (instead of forming the sleeve corresponding to the FIG. 3 embodiment integrally with the reinforcement plate 17). Beyond sleeve 40 the end of the rubber boss may have the FIG. 3 configuration or the specific modification of FIG. 5 in which the enlarged diameter head 30 receivable within the hole enlargement 31, in the mounted condition of the boss shoulders at 311 to provide positive retention.

The described embodiments of FIGS. 3, 4 and 5 may serve as mountings for detachably securing the pad to the gunstock. With the rods 29 removed, strong pulling of the pad will deform the boss configurations within the gunstock holes sufficiently to allow separation of the pad.

FIGS. 6 and 7 illustrate further variational forms of the invention in which bosses 32 molded to present external irregularities such as serrations 33 are insertable in normal undeformed condition into the gunstock holes. Here an expansion mandrel in the form of rod 34 having an inner length 34a beyond weakened section 34b is irregularized beyond the boss as by annular grooves 36. As illustrated, the inside of the boss is correspondingly irregularized. The rod has an enlarged head 35 engageable with the end of the boss to effect its compressive expansion. In this instance the rod 34 is pulled to bring its grooved extent into the boss 32 and the head 35 against the end of the boss. Continued pulling of the rod expands the boss into holding engagement with the well of the gunstock hole as in FIG. 7, following which application of greater pulling force to the rod breaks the latter at its weakened section 34b, permitting removal from the pad of the outer section of the rod while its inner section 34a remains within the boss.

Although having the same boss expansion capabilities as in FIG. 6, the FIG. 7 modification is shown to have the FIG. 5 feature of providing the tubular sleeve 42 as an integral extension of spacer 43 interposed between the pad body 13 and gunstock 11.

We claim:

1. A firearm recoil pad attachable to the end face of a gunstock, comprising a rubber body having a pair of integral tubular rubber bosses projecting from an end face of the body and axially aligned with passages extending through the body, said bosses being receivable within holes in said gunstock end face and being radially deformable by rods received within the bosses through said passages.

2. A recoil pad according to claim 1, in which a reinforcing plate is embedded in the body rubber and said passages extend through the plate.

3. A recoil pad according to claim 1, in which said bosses have predetermined over-sizes in relation to said holes and are longitudinally stretchable by said rods for reception in the holes.

4. A recoil pad according to claim 3, in which the bosses have closed ends engageable by said rods.

5. A recoil pad according to claim 1, including rigid sleeves surrounding said bosses and receivable within said holes.

6. A recoil pad according to claim 5, in which the bosses are radially enlarged beyond said sleeves and have surface iregularities.

7. A recoil pad according to claim 5, in which the sleeves are integral with a reinforcement plate embedded in the pad body.

8. A recoil pad according to claim 5, in which said sleeves are integral with an essentially rigid insert for interposition between the pad body and gunstock.

9. A recoil pad according to claim 1, in which said rods have inner extents permanently embedded in the bosses and movable outwardly to radially compress the bosses against the walls of the gunstock holes.

10. A recoil pad according to claim 9, in which said rods extend through the pad body and are severable by tension at weakened locations within the body.

11. A recoil pad according to claim 10, in which the rods have enlarged heads bearing against the ends of the bosses.

12. A recoil pad according to claim 10, in which a reinforcing plate is embedded in the pad body and the rods extend through the plate.

13. A recoil pad according to claim 11, in which the bosses are externally serrated and the rod extents within the bosses have surface irregularities.

14. The method of attaching to a gunstock a rubber recoil pad having integral tubular rubber bosses receivable within holes in the gunstock, that includes longitudinally moving rods extending through the pad body into the bosses to radially deform the bosses within said holes.

15. The method of claim 14 in which the rod movements initially stretch the bosses axially.

16. The method of claim 15, in which the bosses have closed ends against which the rods bear.

17. The method of claim 14, in which the rods are pulled to expand the bosses and then are severed within the pad body under increased tension.

References Cited
UNITED STATES PATENTS

| 2,925,679 | 2/1960 | Bivens | 42—74 |
| 3,274,725 | 9/1966 | Pachmayr | 42—74 |

BENJAMIN A. BORCHELT, Primary Examiner

C. T. JORDAN, Assistant Examiner